United States Patent
Groethe et al.

(10) Patent No.: US 8,380,669 B2
(45) Date of Patent: Feb. 19, 2013

(54) THROTTLING TO REDUCE SYNCHRONIZATIONS OF EXCESSIVELY CHANGING DATA

(75) Inventors: Karl Martin Groethe, San Francisco, CA (US); Andrew Trevor Belk, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 567 days.

(21) Appl. No.: 12/479,663

(22) Filed: Jun. 5, 2009

(65) Prior Publication Data

US 2010/0312759 A1 Dec. 9, 2010

(51) Int. Cl.
G06F 17/30 (2006.01)

(52) U.S. Cl. ........................................ 707/637
(58) Field of Classification Search ............ None
See application file for complete search history.

(56) References Cited

U.S. PATENT DOCUMENTS

| | | | |
|---|---|---|---|
| 5,710,922 A | 1/1998 | Alley et al. | |
| 6,779,058 B2 | 8/2004 | Kishi et al. | |
| 7,337,193 B1 | 2/2008 | Mills et al. | |
| 7,359,920 B1 | 4/2008 | Rybicki et al. | |
| 7,792,792 B2 * | 9/2010 | Witriol et al. | 707/610 |
| 7,945,535 B2 * | 5/2011 | Toutonghi et al. | 707/665 |
| 2003/0130984 A1 * | 7/2003 | Quinlan et al. | 707/1 |
| 2004/0015510 A1 * | 1/2004 | Moir et al. | 707/101 |
| 2006/0256760 A1 * | 11/2006 | Patrick et al. | 370/337 |
| 2010/0070469 A1 * | 3/2010 | Bomma et al. | 707/610 |
| 2010/0106820 A1 * | 4/2010 | Gulati et al. | 709/224 |

OTHER PUBLICATIONS

Bolton (C Tutorial Lesson 5 About Control Statements, http://web.archive.org/web/20071021083043/http://cplus.about.com/od/learningc/ss/clessonfive_4.htm) as of Oct. 21, 2007.*

* cited by examiner

*Primary Examiner* — Neveen Abel Jalil
*Assistant Examiner* — Kevin L Young
(74) *Attorney, Agent, or Firm* — Blakely, Sokoloff, Taylor & Zafman LLP

(57) ABSTRACT

Embodiments of the invention determine if a user preference or other piece of data is being synchronized too frequently. If the user preference is being synchronized too frequently, synchronization of the user preference is throttled to prevent it from synchronizing for some number of synchronization cycles. If the user preference rarely changes, the user preference is rewarded by throttling it less often.

19 Claims, 8 Drawing Sheets

| Times Disabled | Throttle-Off Decay | Syncs until enabled (switch = 10) |
|---|---|---|
| 0 | 1 | 10 |
| 1 | .5 | 20 |
| 2 | .25 | 40 |
| 3 | .125 | 80 |
| 4 | .0625 | 160 |
| . | . | . |
| . | . | . |
| . | . | . |

Fig. 4

THROTTLING TO REDUCE SYNCHRONIZATIONS OF EXCESSIVELY CHANGING DATA

FIELD OF THE INVENTION

Embodiments of the invention are directed toward synchronization of data between data processing systems, and more specifically toward reducing excessive synchronization of data.

BACKGROUND

FIG. 1 is a diagram illustrating a synchronization process 100 between a local system 107 and a remote system 101. User data 109 on local system 107 is synchronized with user data 103 on remote system 101 through network 105. Network 105 may be a LAN, WAN, internet, an intranet, a cellular data network, etc.

Each time a synchronization occurs between systems 101 and 107, data is transferred between the systems through network 105. Data transfers are costly and require power to send the data, money to pay for bandwidth, etc.

Some user data changes frequently and requires synchronization every time the synchronization process executes. Some frequently changing data is not very important, but incurs the same cost as other more important data. Synchronization of unimportant and/or frequently changing data is prevented by an exclusionary list, but this requires at least one person to maintain the list.

SUMMARY

Embodiments of the invention determine if a user preference or other piece of data is being synchronized too frequently. If the user preference is being synchronized too frequently, synchronization of the user preference is throttled to prevent it from synchronizing for some number of synchronization cycles. If the user preference rarely changes, the user preference is rewarded by throttling it less often.

BRIEF DESCRIPTION OF THE DRAWINGS

The present invention is illustrated by way of example and not limitation in the figures of the accompanying drawings in which like references indicate similar elements.

FIG. 4 is a chart illustrating a progressive throttling scheme according to an embodiment of the invention;

DETAILED DESCRIPTION

Figure 1:
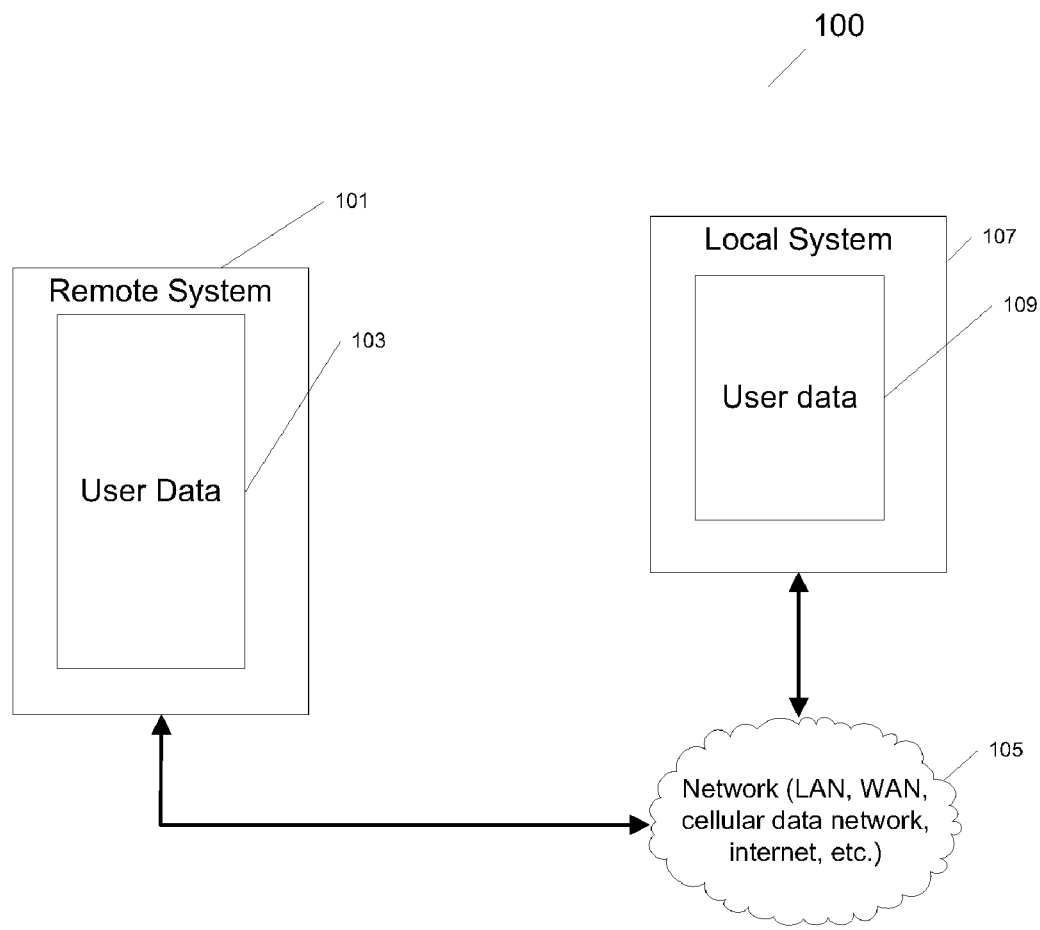
FIG. 1 is a diagram illustrating synchronization between data processing systems.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Synchronizing data allows multiple devices to access a consistent version of data. For example, a user may add a calendar event on a handheld device, and through synchronization that calendar event may appear on a web-based calendar and a home desktop computer. A cost is associated with synchronizing any particular piece of data based on how much data is transferred and how frequently it is transferred. How often a synchronization occurs depends upon how it is initiated. For example, a synchronization may occur when a user requests it, at a periodic interval (e.g., performing a synchronization every hour), or in response to a change to synchronized data.

For example, a contacts program may include a photograph of a contact. The photograph may represent the majority of the storage space allocated to the contact. However, in normal use, the photograph is unlikely to be changed very often. Synchronizing the contact with the photograph when it is first added may be relatively costly, but keeping the contact updated over time should be relatively inexpensive. Another example is a user preference corresponding to a list of recently used applications. This user preference changes frequently, since users typically use different applications over time. Using the example of a periodic synchronization, this user preference is likely to be very costly, since it will likely require synchronization after every period. The value to the user of synchronizing such a preference may be low relative to the cost.

Embodiments of the invention determine if a user preference or other piece of data is being synchronized too frequently. If the user preference is being synchronized too frequently, synchronization of the user preference is throttled to prevent it from synchronizing for some number of synchronization cycles. If the user preference rarely changes, the user preference is rewarded by throttling it less often. User interaction may be minimal or non-existence, since the throttling process is driven by behavior of individual preferences or data.

Figure 2:
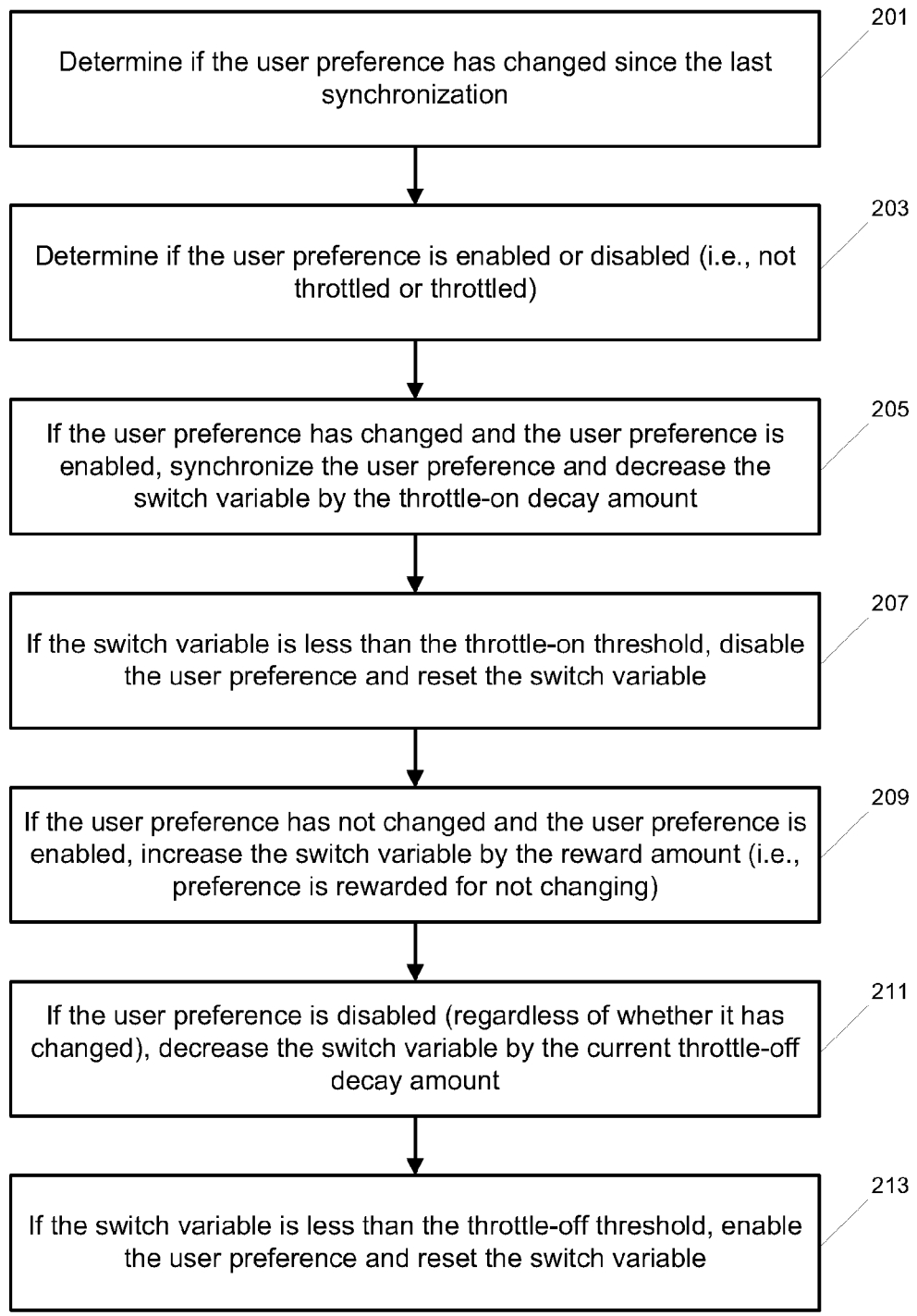
FIG. 2 is a flow chart illustrating a method of throttling synchronization according to an embodiment of the invention.

FIG. 2 is a flowchart illustrating a method of throttling synchronization according to an embodiment of the invention. At block 201, the method determines if a user preference has changed since the last synchronization occurred. At block 203, the method determines if the user preference is enabled or disabled (i.e., the preference is not throttled if the preference is enabled, and the preference is throttled if the preference is disabled). In another embodiment, data other than a user preference may be used, such as contacts, e-mail, photographs, text messages, calendars, games, applications, configuration information, or other user-related or device-related data.

At block 205, the method synchronizes the user preference and decreases the switch variable by the throttle-on decay amount if the user preference has changed and the user preference is enabled. Switch variables and decay amounts may be integer or floating point variables and are described in greater detail below in conjunction with FIGS. 7 and 8. In one embodiment, the user preference is synchronized with remote web-based service, such as MobileMe from Apple Inc. In another embodiment, the user preference is synchronized with a handheld device, a desktop computer, a laptop computer, or other data processing system. In another embodiment, the synchronization occurs over the air, for example through a cellular data network or wireless network.

At block 207, the method disables the user preference if the value of the switch variable has dropped below a threshold (e.g., zero). In this embodiment, the user preference is not synchronized if the switch variable enters the synchronization with a value less than the threshold. In an alternative embodiment, the user preference would be synchronized in addition to becoming disabled.

At block 209, if the user preference has not changed and the user preference is enabled, the switch variable is increased by the reward amount. This rewards the user preference for changing less frequently, and allows the user preference to remain enabled longer. The reward amount is described in greater detail below in conjunction with FIGS. 7 and 8.

At block 211, if the user preference is disabled, regardless of whether the user preference has changed or has not changed since the last synchronization, the method decrements the switch value by the current throttle-off decay amount. The decay amount is a throttle-off decay amount because each time the switch variable is decremented, the disabled preference is closer to become re-enabled (i.e., ceasing to be throttled). In one embodiment, the switch variable is decreased by the throttle-off decay amount if the preference was disabled earlier in the same synchronization at block 207. In an alternative embodiment, the switch variable of a disabled preference is not decreased by the throttle-off decay amount until the next synchronization after the user preference is disabled.

At block 213, if the value of the switch variable is less than the throttle-off threshold, the user preference is enabled and the switch variable is reset. In one embodiment, the user preference is checked to see if it has changed in the same synchronization it is enabled, and synchronized if it has changed. In an alternative embodiment, the enabled preference is not synchronized until the next synchronization. In another embodiment, if a disabled user preference changes while it is disabled, it is marked as changed after it is enabled. In still another embodiment, the disabled user preference is marked as having changed if it changes after being enabled.

Figure 3:
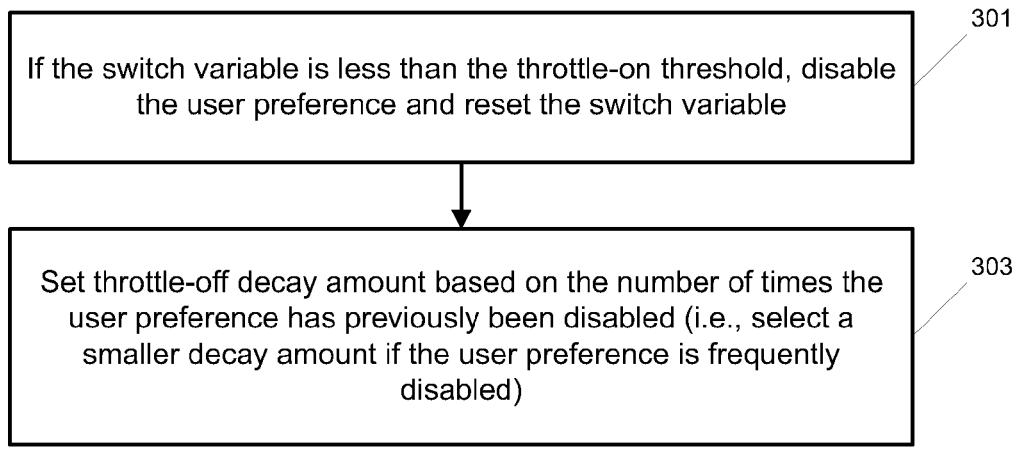
FIG. 3 is a flow chart illustrating a method of throttling adjustment according to an embodiment of the invention.

FIG. 3 is a flowchart illustrating a method of reducing a throttle-off decay based on the number of times a user preference has been disabled. At block 301, the method disables a preference when the value of the switch variable drops below the throttle-on threshold. At block 303, the method sets a throttle-off decay value based on the number of times the user preference has previously been disabled. If a preference changes frequently, its throttle-off decay amount will decrease frequently. In one embodiment, after a user preference is disabled several times, its throttle-off decay amount will become so small that the user preference will not become enabled for a considerable period of time (i.e., for a large number of synchronizations). Throttle-off decay values are described in greater detail below in conjunction with FIGS. 7 and 8.

FIG. 4 shows a chart 400 which includes a times disabled column 401, a throttle-off decay column 403, and a syncs until enabled column 405. For example, if a user preference has never been disabled, and is disabled for the first time (times disabled=0), the throttle-off decay will be 1. Assuming a default switch variable value of 10, ten synchronizations will occur before the user preference is enabled. As another example, if a user preference has been disabled four previous times, and is disabled again, its throttle-off decay amount will be 0.0625, assuming a disable multiplier of 0.5. In this case, the user preference will be disabled for 160 synchronizations before it is enabled.

Figure 7:
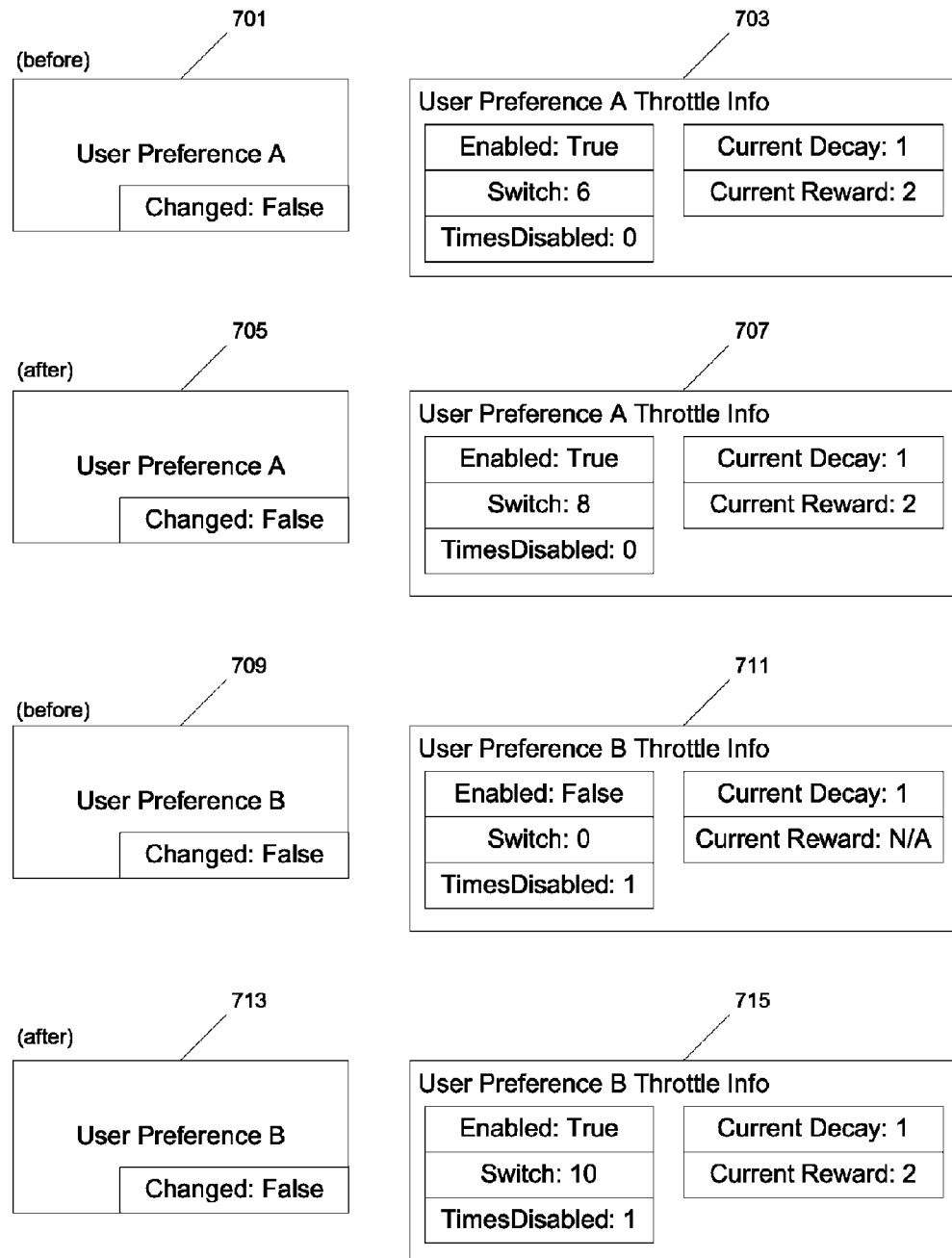
FIGS. 7 and 8 are diagrams illustrating examples of throttling according to embodiments of the invention.
Figure 8:
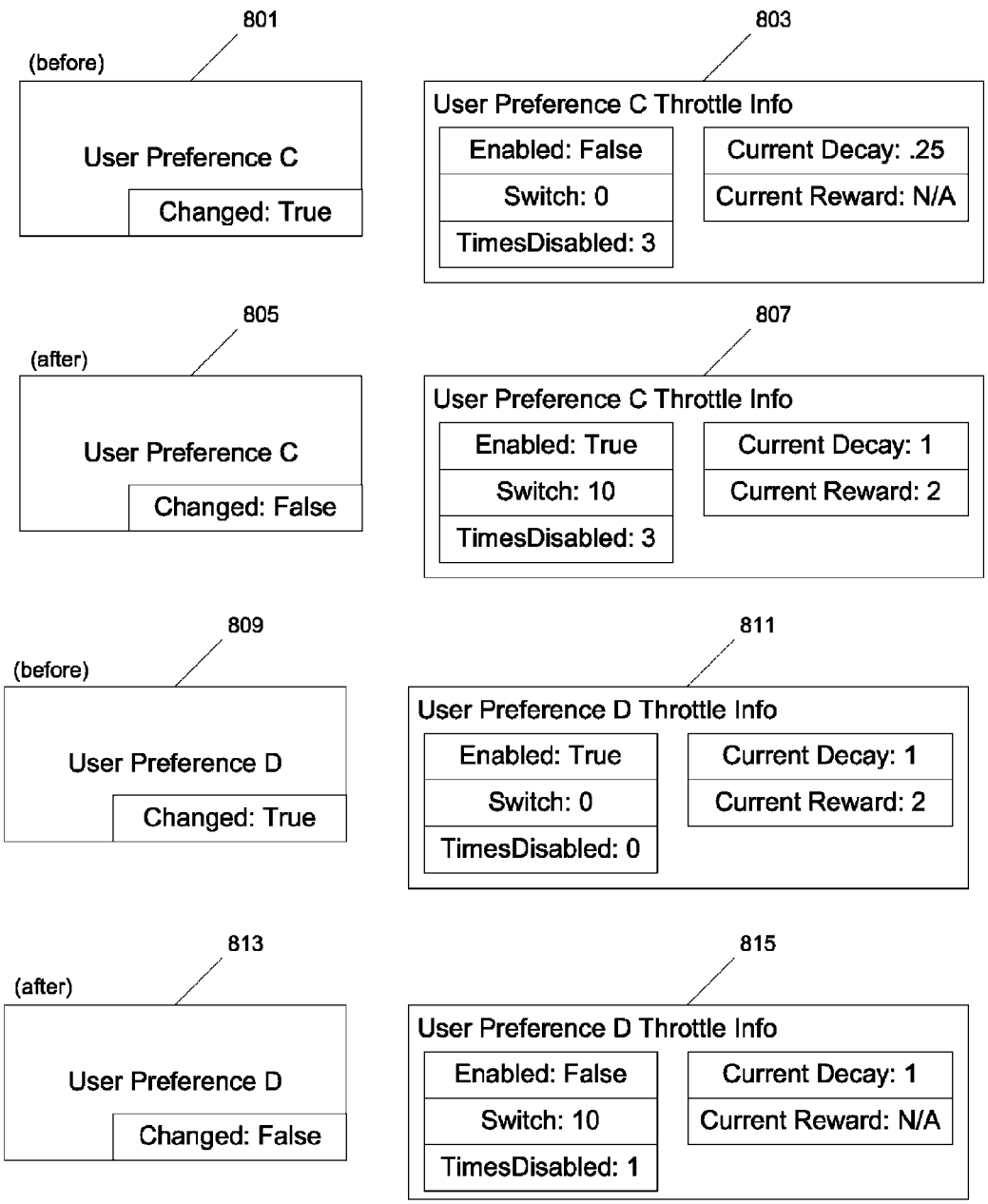

FIGS. 7 and 8 are diagrams illustrating embodiments of the invention. User preference 701 and user preference throttle information 703 illustrate the user preference immediately before a synchronization. Preference 701 has not changed since the last synchronization, so the current reward of 2 will be added to the current switch value of 6. User preference 705 and 707 illustrate the user preference immediately after the synchronization. The switch value now has a value of 8, reflecting the reward for not changing. By rewarding a user preference for changing infrequently, the preference may be disabled rarely or not at all, and is synchronized each time it does change.

In one embodiment, the value of the switch variable is bounded by a ceiling threshold. For example, the value of the switch variable may be bounded by 20. Supposing a user preference has a current switch value of 10, an upper bound of 20, and a reward value of 2, the switch value of the user preference would be rewarded for no more than 5 consecutive synchronizations in which the user preference did not change. Providing an upper bound on the switch value of an enabled preference may decrease the number of situations in which an enabled preference doesn't change for a large number of consecutive synchronizations, but then begins changing every synchronization. For example, a user preference may remain unchanged for 100 synchronizations, which may result in an unbounded switch value of 200. Supposing a throttle-on decay value of 1, this would require that the user preference change in 200 synchronizations before the user preference could be disabled. In one embodiment, the value of the switch variable of a user preference is set higher than the default switch value to give an advantage to user preferences that generally do not change excessively.

User preference 709 and user preference info 711 illustrate the user preference immediately before a synchronization. The user preference is currently disabled and has a throttle-off decay value of 1 and a switch variable value of 0. User preference 713 and user preference info 715 illustrate the user preference immediately after the synchronization. The user preference is now enabled, since its switch value decayed below the threshold of zero. The switch variable value has been reset to 10, and the decay to 1.

User preference 801 and user preference throttle information 803 in FIG. 8 illustrate a user preference immediately before a synchronization. The user preference is currently disabled and has been disabled three times in the past. The value of the switch variable is 0, so at the current decay of 0.25, the switch will drop below the throttle-off threshold of 0 after the decay is applied. User preference 805 and user preference info 807 illustrate the user preference immediately after the synchronization. The preference has been enabled and the switch value reset to 10. The decay has been reset to 1. If the preference is disabled again, its decay amount will drop to 0.125 and it will wait 80 synchronizations before becoming enabled.

User preference 809 and user preference info 811 illustrate a user preference immediately before a synchronization. The user preference has changed and has never been disabled. The value of the switch variable is zero. Since the preference has changed, the decay value will be subtracted from the switch variable, causing the value of the switch variable to drop below the threshold of zero. User preference 813 and user preference info 815 illustrate the user preference immediately after the synchronization. Synchronization of the preference is now disabled. The switch variable has been reset to 10. The current decay is 1, since this is the first time the preference has been disabled. The preference will be enabled after ten synchronizations occur.

In one embodiment, the throttle-on decay, the reward amount, the throttle-off decay, default switch variable value, upper bound on the switch variable value, and the disabled multiplier are modifiable by a system administrator. These values may be predetermined by a vendor of the synchronization system. One or more of these values may be part of a throttling profile specified by a user or a vendor. A user or vendor may assign different throttling profiles to different user preferences or categories of user preferences (or other data). The current throttling profile may change based on external factors, such as power source. For example, throttling may be disabled or reduced for a user preference if the device is connected to an A/C power source, while throttling may be enabled or become more aggressive if the device is running off of a battery.

In another embodiment, throttling is implemented separately from the synchronization system. For example, throttling may be a plug-in that adds functionality to a synchronization system. Throttling may also be implemented as part of the synchronization system.

In one embodiment, a user of a device that has the user preference may specify whether that user preference (or other data) is to be synchronized or not. The user may also specify whether the synchronization of the user preference is permitted to be throttled. Configuration data corresponding to whether or not a user preference is to be synchronized and whether or not the user preference is to be throttled may have default settings specified by a vendor, manufacturer, or other organization. The user of the device may or may not be allowed to override a default setting.

In still another embodiment of the invention, a throttling status of a user preference or other piece of data may be reset at certain intervals. A user may cause the status to be reset. Certain types of synchronization may automatically reset or overwrite the throttling status, such as a synchronization that overwrites all of the data on a device. Throttle status may be reset after an amount of time has passed, for example, a month.

Figure 5:
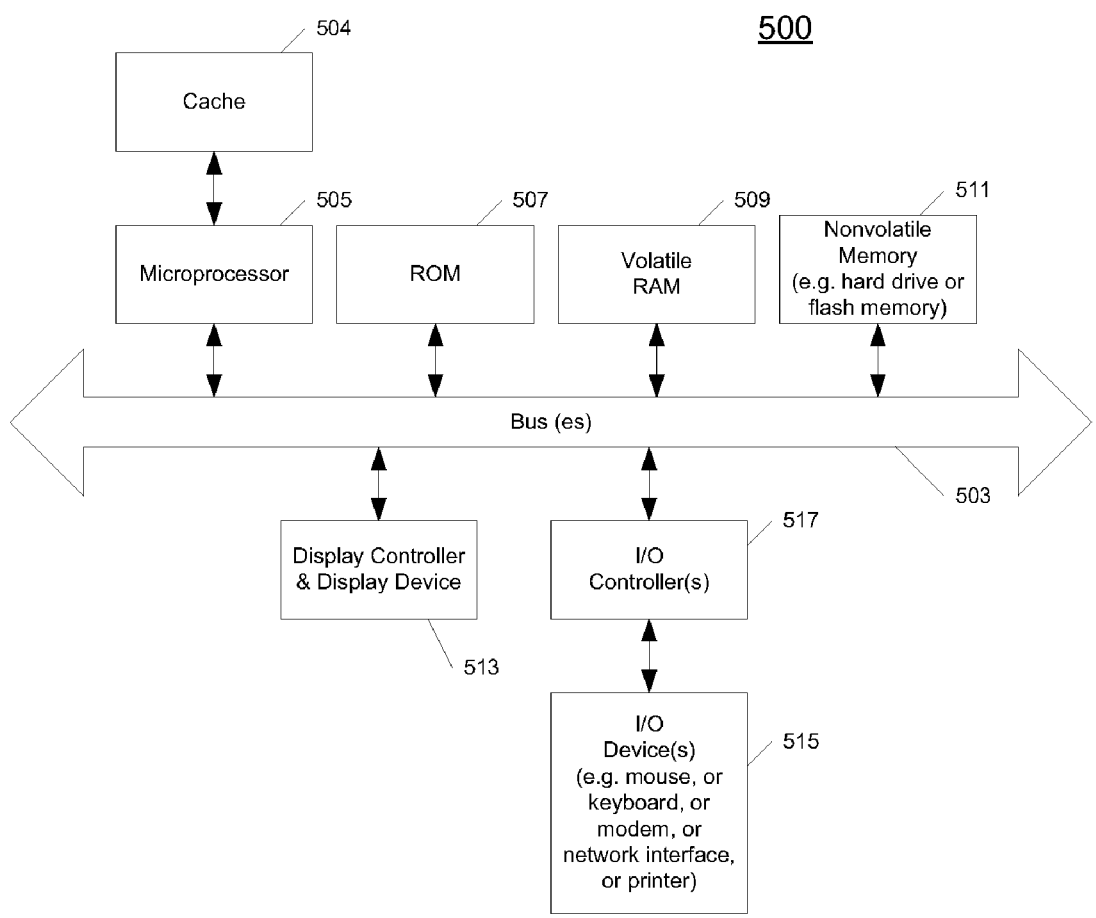
FIG. 5 is a diagram illustrating a data processing system suitable for practicing embodiments of the invention.

FIG. 5 shows one example of a data processing system which may be used with one embodiment the present invention. Remote system 101 and/or local system 107 of FIG. 1 may be implemented with a data processing system like the one illustrated in FIG. 5. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 5, the computer system 500, which is a form of a data processing system, includes a bus 503 which is coupled to a microprocessor(s) 505 and a ROM (Read Only Memory) 507 and volatile RAM 509 and a non-volatile memory 511. The microprocessor 505 is coupled to cache 504. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 513 and to peripheral devices such as input/output (I/O) devices which may be mice, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory.

The mass storage 511 is typically a magnetic hard drive or a magnetic optical drive or an optical drive or a DVD RAM or a flash memory or other types of memory systems which maintain data (e.g. large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art.

Figure 6:
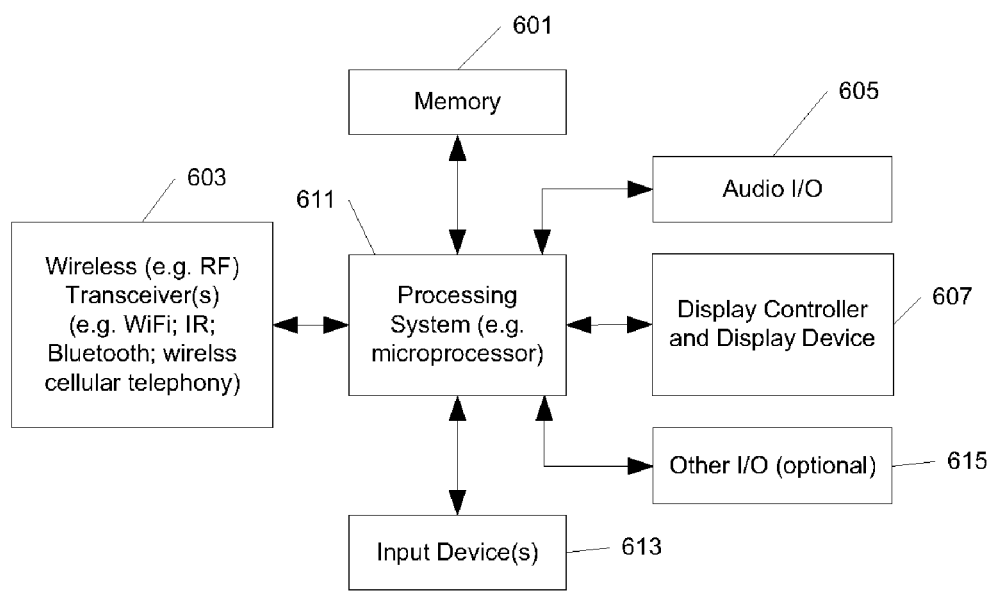
FIG. 6 is a diagram illustrating a device suitable for practicing embodiments of the invention.

FIG. 6 shows an example of another data processing system which may be used with one embodiment of the present invention. For example, system 600 may be implemented as part of system as shown in FIG. 1. The data processing system 600 shown in FIG. 6 includes a processing system 611, which may be one or more microprocessors, or which may be a system on a chip integrated circuit, and the system also includes memory 601 for storing data and programs for execution by the processing system. The system 600 also includes an audio input/output subsystem 605 which may include a microphone and a speaker for, for example, playing back music or providing telephone functionality through the speaker and microphone.

A display controller and display device 607 provide a visual user interface for the user; this digital interface may include a graphical user interface which is similar to that shown on a Macintosh computer when running OS X operating system software. The system 600 also includes one or more wireless transceivers 603 to communicate with another data processing system, such as the system 500 of FIG. 5. A wireless transceiver may be a WiFi transceiver, an infrared transceiver, a Bluetooth transceiver, and/or a wireless cellular telephony transceiver. It will be appreciated that additional components, not shown, may also be part of the system 600 in certain embodiments, and in certain embodiments fewer components than shown in FIG. 6 may also be used in a data processing system. The data processing system 600 also includes one or more input devices 613 which are provided to allow a user to provide input to the system. These input devices may be a keypad or a keyboard or a touch panel or a multi touch panel. The data processing system 600 also includes an optional input/output device 615 which may be a connector for a dock. It will be appreciated that one or more buses, not shown, may be used to interconnect the various components as is well known in the art. The data processing system shown in FIG. 6 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 600 may be a network computer or an embedded processing device within another device, or other types of data processing systems which have fewer components or perhaps more components than that shown in FIG. 6.

In some embodiments, instructions may be stored on a machine readable storage medium such as mass storage 511 or RAM 509, when executed by a processor such as microprocessor 505, cause the processor to perform a method such as the methods illustrated in FIGS. 2 and 3.

In some embodiments, methods such as the methods illustrated in FIGS. 2 and 3 may be performed, executed, or otherwise carried out by a data processing system such as the data processing systems illustrated in FIGS. 5 and 6.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine readable storage medium storing instructions which when executed by a processor cause the processor to perform a method, the method comprising:
   determining that a piece of data is being synchronized more than a threshold number of times, wherein the determining comprises determining that a change variable value is less than a throttle-on threshold; and
   disabling synchronization of the piece of data for a number of subsequent synchronization cycles, in response to determining that the piece of data is being synchronized more than the threshold number of times, wherein the number of subsequent synchronization cycles is based on a number of times synchronization has been disabled for the piece of data, and wherein the disabling comprises:
      setting the change variable value to a reset value,
      setting a throttle-off decay value based on the number of times synchronization has been disabled for the piece of data, wherein the throttle-off decay value is decreased for each time synchronization has been disabled for the piece of data, and
      decrementing the change variable value by the throttle-off decay value for each subsequent synchronization cycle.

2. The non-transitory machine readable storage medium of claim 1 wherein determining that the piece of data is being synchronized more than the threshold number of times comprises:
   enabling synchronization of the piece of data for a plurality of synchronization cycles;
   modifying the change variable value for each of the plurality of synchronization cycles.

3. The non-transitory machine readable storage medium of claim 1 wherein disabling synchronization of the piece of data for the number of subsequent synchronization cycles comprises:
   setting a throttle flag indicating that synchronization of the piece of data is disabled.

4. The non-transitory machine-readable storage medium of claim 1 wherein the piece of data is a user preference and the method further comprises:
   synchronizing the piece of data with a remote data processing system, wherein the remote data processing system is a web-based service.

5. A data processing system comprising:
   a processor;
   a memory coupled to the processor through a bus;
   a network interface coupled to the processor through the bus; and
   instructions stored on the memory which when executed by the processor cause the processor to:
      perform a periodic synchronization of modified user data items with a remote data processing system through the network interface,
      identify a user data item that requires synchronization more than a threshold number of times, wherein the identifying comprises determining that a change variable value is less than a throttle-on threshold, and
      disable synchronization for the user data item for a number of subsequent periodic synchronization cycles, wherein the disabling comprises:
         setting the change variable value to a reset value,
         setting a throttle-off decay value based on the number of times synchronization has been disabled for the piece of data, wherein the throttle-off decay value is decreased for each time synchronization has been disabled for the piece of data, and
         decrementing the change variable value by the throttle-off decay value for each subsequent synchronization cycle.

6. The data processing system of claim 5 wherein the user data items are user preferences and wherein identifying the user data item that requires synchronization more than the threshold number of times comprises:
   enabling synchronization of the user data item for a plurality of synchronization cycles;
   modifying the change variable value for each of the plurality of synchronization cycles.

7. A method comprising:
   determining that a piece of data is being synchronized more than a threshold number of times, wherein the determining comprises determining that a change variable value is less than a throttle-on threshold; and
   disabling synchronization of the piece of data for a number of subsequent synchronization cycles, in response to determining that the piece of data is being synchronized more than the threshold number of times, wherein the number of subsequent synchronization cycles is based on a number of times synchronization has been disabled for the piece of data, and wherein the disabling comprises:
      setting the change variable value to a reset value,
      setting a throttle-off decay value based on the number of times synchronization has been disabled for the piece of data, wherein the throttle-off decay value is decreased for each time synchronization has been disabled for the piece of data, and
      decrementing the change variable value by the throttle-off decay value for each subsequent synchronization cycle.

8. The method of claim 7 wherein determining that the piece of data is being synchronized more than the threshold number of times comprises:
   enabling synchronization of the piece of data for a plurality of synchronization cycles; and
   modifying the change variable value for each of the plurality of synchronization cycles.

9. The method of claim 7 wherein disabling synchronization of the piece of data for the number of subsequent synchronization cycles comprises:
   setting a throttle flag indicating that synchronization of the piece of data is disabled.

10. The method of claim 7 wherein the piece of data is a user preference and the method further comprises:
synchronizing the piece of data with a remote data processing system, wherein the remote data processing system is a web-based service.

11. The non-transitory machine readable storage medium of claim 2 wherein determining that the piece of data is being synchronized more than the threshold number of times further comprises:
assigning a throttling profile to the piece of data based on a frequency with which the piece of data changes, the throttling profile defining at least one of the throttle-on threshold, a reward amount, and a throttle-on decay amount.

12. The non-transitory machine readable storage medium of claim 11 wherein modifying the change variable value for each of the plurality of synchronization cycles comprises:
determining whether the piece of data has changed since an immediately preceding synchronization cycle;
increasing the change variable value by the reward amount if the piece of data has not changed; and
decreasing the change variable value by the throttle-on decay amount if the piece of data has changed.

13. The non-transitory machine readable storage medium of claim 1 wherein the method further comprises:
in response to determining that the piece of data is being synchronized more than the threshold number of times, synchronizing the piece of data once more before disabling synchronization of the piece of data for the number of subsequent synchronization cycles.

14. The data processing system of claim 6 wherein determining that the user data item is being synchronized more than the threshold number of times further comprises:
assigning a throttling profile to the user data item based on a frequency with which the user data item changes, the throttling profile defining at least one of the throttle-on threshold, a reward amount, and a throttle-on decay amount.

15. The data processing system of claim 14 wherein modifying the value of the switch variable for each of the plurality of synchronization cycles comprises:
determining whether the user data item has changed since an immediately preceding synchronization cycle;
increasing the change variable value by the reward amount if the user data item has not changed; and
decreasing the change variable value by the throttle-on decay amount if the user data item has changed.

16. The data processing system of claim 5 wherein the method further comprises:
in response to identifying the user data item that requires synchronization more than a threshold number of times, the processor performs a synchronization of the user data item once more before disabling synchronization for the user data item for subsequent periodic synchronization cycles.

17. The method of claim 8 wherein determining that the piece of data is being synchronized more than the threshold number of times further comprises:
assigning a throttling profile to the piece of data based on a frequency with which the piece of data changes, the throttling profile defining at least one of the throttle-on threshold, a reward amount, and a throttle-on decay amount.

18. The method of claim 17 wherein modifying the change variable value for each of the plurality of synchronization cycles comprises:
determining whether the piece of data has changed since an immediately preceding synchronization cycle;
increasing the change variable value by the reward amount if the piece of data has not changed; and
decreasing the change variable value by the throttle-on decay amount if the piece of data has changed.

19. The method of claim 7 wherein the method further comprises:
in response to determining that the piece of data is being synchronized more than the threshold number of times, synchronizing the piece of data once more before disabling synchronization of the piece of data for the number of subsequent synchronization cycles.

* * * * *